United States Patent [19]

Iwata

[11] Patent Number: 4,545,457
[45] Date of Patent: Oct. 8, 1985

[54] GEAR SHIFTING APPARATUS OF A TRANSMISSION FOR A FOUR-WHEEL DRIVE VEHICLE

[75] Inventor: Seiichi Iwata, Mizuhomachi, Japan

[73] Assignee: Fuji Jukogyo Kabushiki Kaisha, Tokyo, Japan

[21] Appl. No.: 440,131

[22] Filed: Nov. 8, 1982

[30] Foreign Application Priority Data

Nov. 13, 1981 [JP] Japan ................. 56-182457

[51] Int. Cl.$^4$ ............ B60K 23/08; B60K 41/22; G05G 5/10
[52] U.S. Cl. ................. 180/247; 74/477; 192/3.63
[58] Field of Search ........... 74/477, 483 R, 483 K; 180/247; 192/3.63

[56] References Cited

U.S. PATENT DOCUMENTS

| | | | |
|---|---|---|---|
| 2,329,916 | 9/1943 | Lamb et al. ................ | 180/247 |
| 3,354,741 | 11/1967 | Johnston, Jr. et al. ........ | 74/477 |
| 3,529,487 | 9/1970 | Dolan ...................... | 180/247 X |
| 3,627,072 | 12/1971 | Smirl ...................... | 74/711 X |
| 3,988,951 | 11/1976 | Mair et al. ................. | 74/864 X |
| 4,275,608 | 6/1981 | Brancolini ................. | 74/740 X |
| 4,466,306 | 8/1984 | Katayma ................... | 180/247 |

Primary Examiner—Allan D. Herrmann
Attorney, Agent, or Firm—Martin A. Farber

[57] ABSTRACT

A gear shifting apparatus of a transmission for a four-wheel drive vehicle comprises a final reduction device for transmitting the output of the transmission to rear wheels, and a clutch for additional transmitting the output of the transmission to front wheels. An extra low speed gear device having a reduction gear ratio higher than that of the first speed gear of the transmission is provided in the transmission. A shifter rod operated by a gearshift lever is provided for engaging the extra low speed gear device, and a shifter rail is provided for engaging the clutch for four-wheel driving. A lock device operatively connected to the shifter rod and to the shifter rail is provided for locking the shifter rod when the shifter rail is shifted to disengage the clutch for preventing the engagement of the extra low speed gear device by the operation of the shifter rod.

2 Claims, 8 Drawing Figures

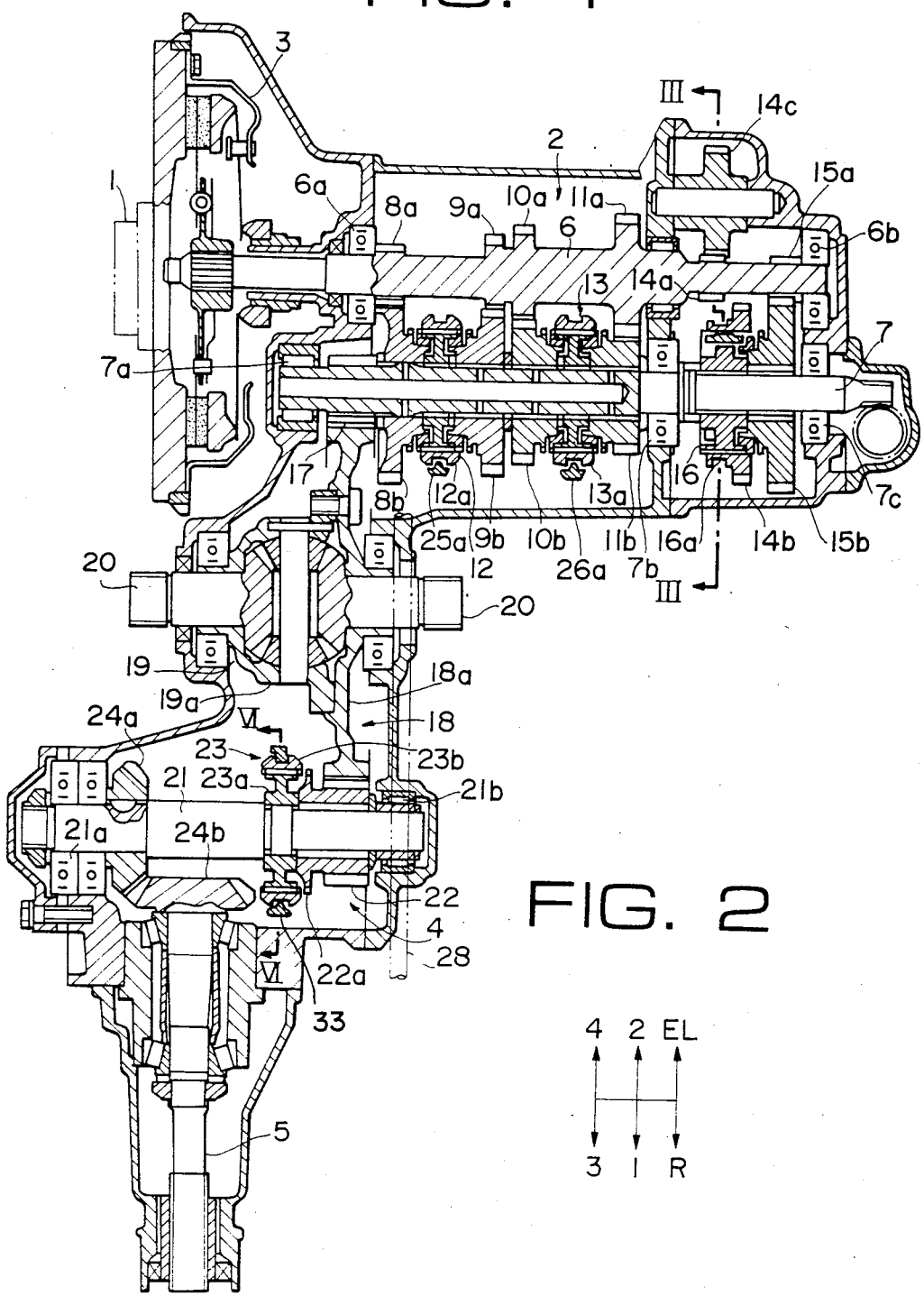
FIG. 1
FIG. 2
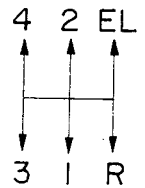

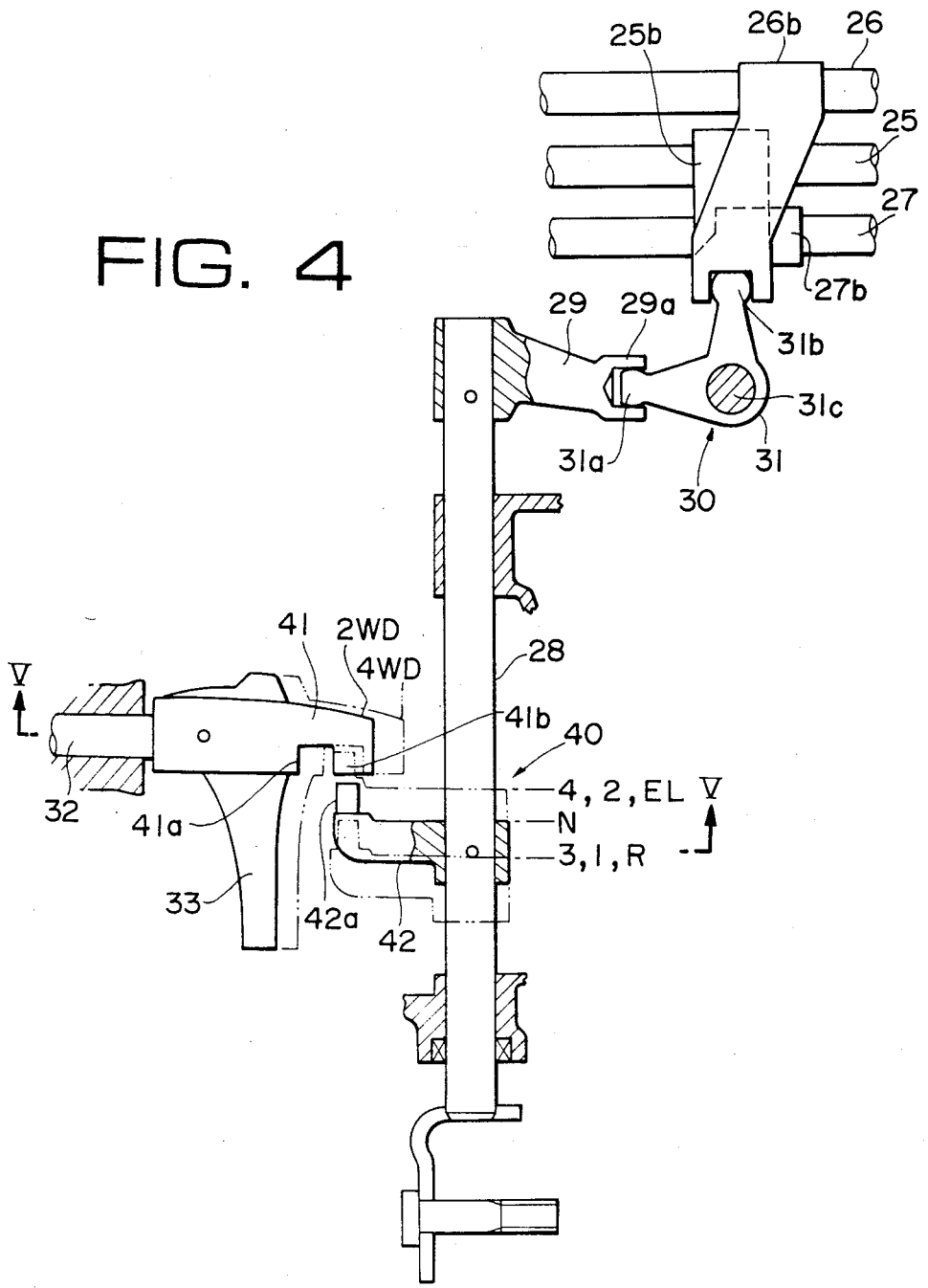

GEAR SHIFTING APPARATUS OF A TRANSMISSION FOR A FOUR-WHEEL DRIVE VEHICLE

BACKGROUND OF THE INVENTION

The present invention relates to an apparatus for shifting change speed gears of a transmission for a four-wheel drive motor vehicle which is also selectively driven by two wheels.

A four-wheel drive vehicle having a set of continuously driving wheels and a set of selectively driving wheels for four-wheel driving is known and a transmission provided with an extra low speed gear or emergency low gear for four-wheel driving is known. The extra low speed gear has a higher reduction gear ratio than the first speed gear and is used when high reduction gear ratio driving is necessary, for example, driving up an extremely steep hill by four-wheel driving. If the vehicle is driven by two wheels in the extra low speed gear, a differential, axles and other components of the two-wheel driving system are subjected to an excessive heavy load. Since such a severe driving condition is done at four-wheel driving, it is not necessary to construct the two-wheel driving system with high strength structure so as to bear the excessively heavy load. However, it is necessary to provide a device for preventing the shifting into the extra low gear during two-wheel driving in order to avoid breakdown of the two-wheel driving system.

SUMMARY OF THE INVENTION

The object of the present invention is to provide an apparatus for shifting into an extra low gear of a transmission which is provided with a device for preventing the shifting the extra low gear during two-wheel driving.

According to the present invention, a gear shifting apparatus of a transmission for a selectively four-wheel drive vehicle having two sets of driving wheels, comprises: a final reduction device for transmitting output of the transmission to one of the two sets of driving wheels; a clutch for transmitting the output of the transmission to the other set of driving wheels; an extra low speed gear device provided in the transmission and having a reduction gear ratio higher than that of a first speed gear of the transmission; first means for engaging the extra low speed gear device; second means for engaging the clutch for four-wheel driving; and a lock device operatively connected to the first and second means for locking the first means when the second means disengages the clutch for preventing the engagement of the extra low speed gear device by the operation of the first means; said first means comprises a shifter rod operated by a gearshift lever of said vehicle for selectively engaging change speed gears in said transmission; said second means comprises a shifter rail for engaging said clutch; and said lock device comprises an engaging arm secured to said shifter rod and an engaging projection formed at an end of shifter rail, said engaging projection has a locking portion which obstructs the movement of said arm to an extra low speed position.

The present invention will be more apparent from the following description made with reference to the accompanying drawings.

BRIEF DESCRIPTION OF DRAWINGS

FIG. 1 is an axial sectional view showing a transmission to which the present invention is applied;

FIG. 2 is an illustration showing a shift pattern of a shift lever;

FIG. 4 is a plan view partly broken-away and in section showing a principal portion of an apparatus according to the present invention;

DETAILED DESCRIPTION OF PREFERRED EMBODIMENTS

Figure 3:
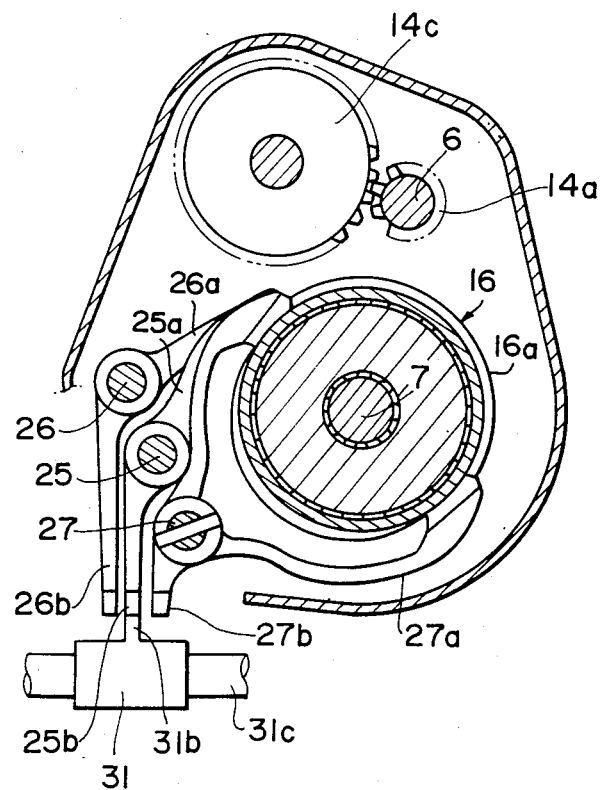
FIG. 3 is a sectional view of a principal portion of a manipulating device.

Referring to FIG. 1, a crankshaft 1 of an engine (not shown) which is transversely disposed in a front portion of an automobile is selectively connected to a main drive shaft 6 of a transmission 2 through a clutch 3. The transmission 2 is disposed in alignment with the crankshaft 1 of the engine. The output of the transmission is transmitted to either front or rear wheels of the vehicle, for example, to the rear wheels in this embodiment, through a final reduction device 18 and a transfer device 4 as described hereinafter. The main drive shaft 6 of the transmission 2 is rotatably supported by bearings 6a and 6b and is connected to a hub of the clutch 3.

A sub-drive shaft 7 is disposed in parallel with the main drive shaft 6 and supported by bearings 7a, 7b and 7c. The main drive shaft 6 has a drive gear 8a for the first speed, a drive gear 9a for the second speed, a drive gear 10a for the third speed and a drive gear 11a for the fourth speed. On the sub-drive shaft 7, driven gears 8b, 9b, 10b and 11b, respectively engaged with gears 9a to 10a are rotatably mounted. Between the gears 8b and 9b, a first synchromesh device 12 is provided for coupling the gear 8b or 9b to the sub-drive shaft 7 for the first and second speeds. A second synchromesh device 13 is similarly provided between the gears 10b and 11b for the third and fourth speeds. In addition, a drive gear 15a for the extra low speed is formed on the main drive shaft 6 and engaged with driven gear 15b rotatably mounted on the shaft 7. A third synchromesh device 16 is mounted on the shaft 7 for the extra low speed.

The third synchromesh device 16 has a sleeve 16a formed with a rear driven gear 14b. When the sleeve 16 is shifted to the left, the gear 14b engages with an idler gear 14c which engages with a reverse drive gear 14a provided on the main drive shaft 6. It should be noted that the gear ratio of the extra low speed is higher than that of the first speed.

First speed gear 8b, third speed gear 10b and reverse gear 14a are disposed on the right sides of synchromesh devices 12, 13 and 16, and second speed gear 9b, fourth speed gear 11b and the extra low speed gear 15b are disposed on the opposite sides, respectively. Accordingly, the shift pattern of a gearshift lever (not shown) for shifting the gears is as shown in FIG. 2. The final reduction device 18 has a final reduction gear 18a which engages with an output gear 17 secured to an inner end of the sub-drive shaft 7. The final reduction gear 18a is secured to a differential case 19a of a differential 19. The differential 19 is operatively connected to rear axles 20.

The final reduction gear 18a engages with a gear 22 of the transfer device 4. The gear 22 is rotatably mounted on a shaft 21 transversely disposed and supported by bearings 21a and 21b at both ends. The transfer device 4 is provided with a clutch 23 which comprises a clutch hub 23a securely engaged with the shaft 21, a sleeve 23b slidably engaged with the clutch hub 23a by splines, and splines 22a provided on one side of the gear 22. A bevel gear 24a is secured to the shaft 21 at the other end of the shaft and engages with a bevel gear 24b secured to a front-wheel drive shaft 5 which is longitudinally disposed along the center line of the vehicle and operatively connected to front wheels of the vehicle through a differential (not shown).

Figure 5:
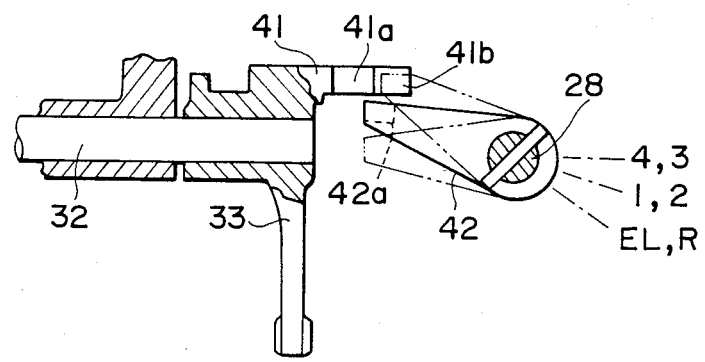
FIG. 5 is a sectional view taken along the line V—V of FIG. 4.

Referring to FIGS. 3 to 5, a shifter rail 25 for first and second speeds, shifter rail 26 for third and fourth speeds and shifter rail 27 for reverse and extra low speed are disposed in parallel with the drive shaft 7. A shifter fork 25a (FIG. 1) secured to the shifter rail 25 engages with a sleeve 12a of the synchromesh device 12, a shifter fork 26a secured to the shifter rail 26 engages a sleeve 13a of the synchromesh device 13, and a shifter fork 27a (see FIG. 3) of the shifter rail 27 engages a sleeve 16a of the synchromesh device 16.

A shifter rod 28 operatively connected to the gearshift lever and extending therefrom to a position adjacent to the shifter rails is supported so as to permit rotation about its axis and shifting in the axial direction. By shifting the shifter rod 28, one of positions (4th, 3rd, 1st, 2nd speeds, R-reverse and El-extra low) is selected and by rotating the shifter rod 28, one of the gears is engaged. An arm 29 secured to an end of the shifter rod 28 has a fork 29a which engages with an end 31a of a selector lever 31 of a selector device 30. The selector lever 31 is secured to a shaft 31c which is rotatable and slidable in the axial direction. Forks of shifter arms 25b, 26b and 27b of shifter rails 25, 26, and 27 are disposed in alignment with each other as shown in FIG. 4, so that the other end 31b of the selector lever 31 may be engaged with one of the forks.

Figure 6:
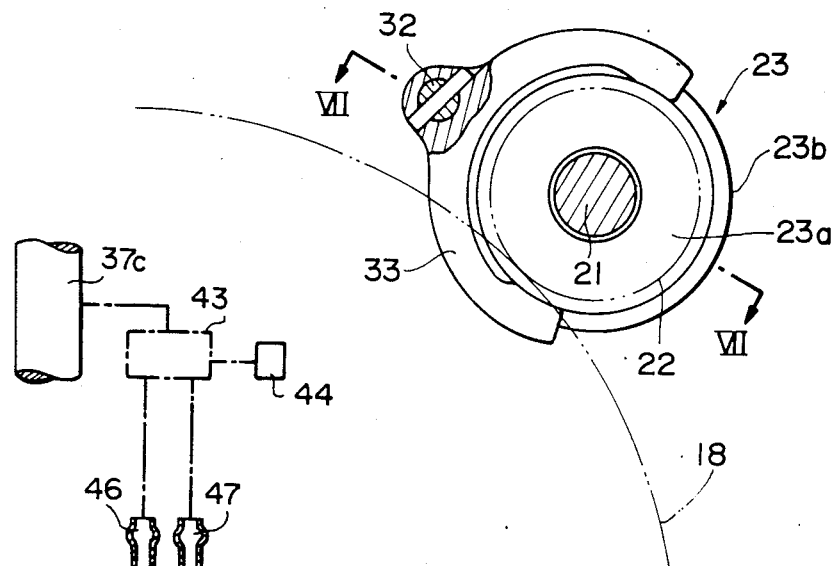
FIG. 6 is a sectional view taken along the line VI—VI of FIG. 1.
Figure 7:
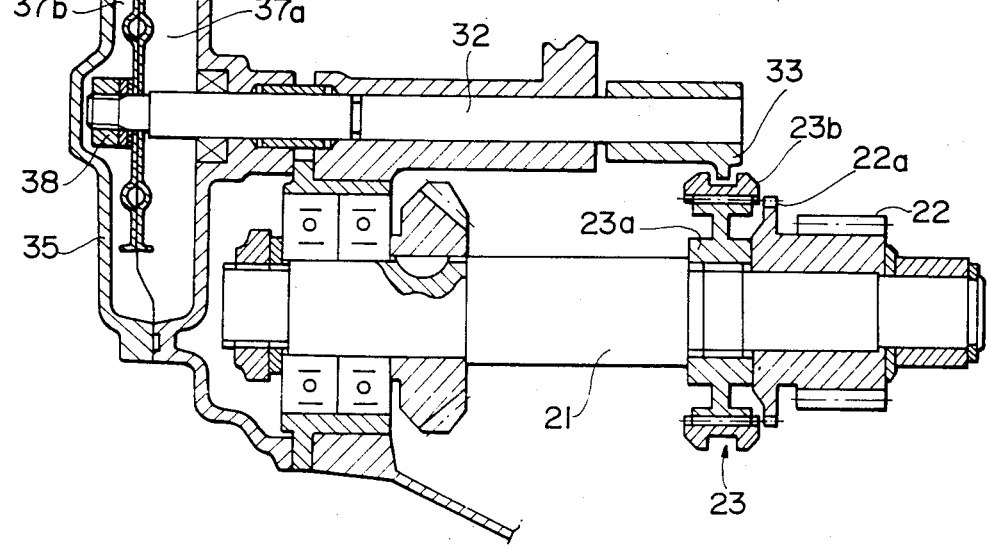
FIG. 7 is a sectional view taken along the line VII—VII of FIG. 6.

Referring to FIGS. 6 and 7, a shifter fork 33 engaging with the sleeve 23b of the clutch 23 is secured to a shifter rail 32. The shifter rail 32 extends in parallel with the shaft 21 and is connected to a diaphragm 36 of a vacuum actuator 34 by a nut 38. The vacuum actuator 34 has vacuum chambers 37a and 37b separated by the diaphragm 36 and both of the chambers are communicated with an induction passage 37c of the engine through a change-over valve 43 which is actuated by a switch 44 in the driver's area, so that vacuum in the induction passage is selectively applied to one of chambers 37a, 37b through passage 46 or 47. When the vacuum is applied to the chamber 37a, the diaphragm 36 deflects to the right to shift the shifter rail 32, so that sleeve 23b engages with the splines 22a to establish four-wheel driving.

Referring to FIGS. 4 and 5, a lock device 40 is provided between the shifter fork 33 and the shifter rod 28 for preventing the shifting of the rod to the extra low position during the two-wheel driving. The lock device 40 comprises an engaging projection 41 extending from the shifter fork 33 toward the shifter rod 28, and an engaging arm 42 secured to the shifter rod projecting toward the engaging projection 41. The engaging projection 41 as a recess 41a and a locking projection 41b.

The arm 42 has a projecting end 42a, which is disposed to engage the locking projection 41b when the shifter rod 28 is shifted toward the extra low speed position during two-wheel driving.

Figure 8:
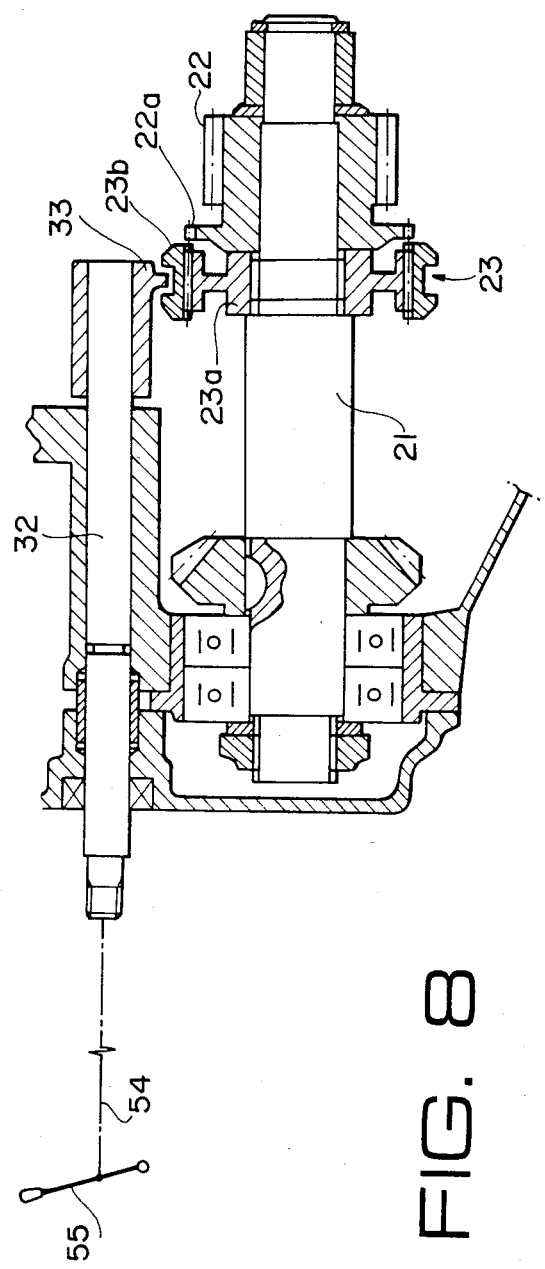
FIG. 8 is a sectional view showing another embodiment of FIG. 7.

In the embodiment of FIG. 8, the shifter rail 32 is connected to an actuating lever 55 in the driver's area through a wire 54 for the shifting of the shifter rail.

In operation, when the vacuum in the induction passage is applied to the vacuum chamber 37b, the diaphragm 36 is deflected to the left to shift the shifter rail 32 and shifter fork 33 as shown in FIG. 7. Thus, the sleeve 23b of the clutch 23 is disengaged from the splines 22a, so that the output of the transmission at the gear 22 is not transmitted to the front-wheel drive shaft 5. Accordingly, the vehicle is driven by two-wheel driving of the rear wheels. FIGS. 4 and 5 show a state of the lock device 40 at two-wheel driving. In such a state, when the shifter rod 28 is positioned in the neutral position, that is between the first and second speed position (1, 2 position in FIG. 5) or rotated to between the third and fourth speed position (4, 3 position in FIG. 5) by operating the gearshift lever, the projecting end 42a of the arm 42 does not face the locking projection 41b of the engaging projection 41. Therefore, the shifter rod 28 can be shifted to the second speed position and fourth speed position. Thus, one of the first speed to fourth speed gears can be selected by operating the gearshift lever.

However, when the shifter rod 28 is rotated toward the extra low and reverse position (EL, R position in FIG. 5), the projecting end 42a faces the locking projection 41b. Accordingly, the shifter rod 28 cannot be shifted to the extra low speed position, because of the engagement of projecting end 42a with the locking projection 41b. It will be noted that the shifter rod 28 can be shifted to the reverse gear position opposite to the extra low speed position.

When the vacuum in the induction passage 37c is applied to the vacuum chamber 37a by operating the change-over switch 44, the shifter rail 32 is shifted to the right to engage the sleeve 23b with splines 22a. Thus, four-wheel driving power transmission system is established. Since the shifter rail 32 is located at the right position shown by chain lines in FIG. 4, the recess 41a of the engaging projection is in the position corresponding to the projecting end 42a. Thus, movement of the arm 42 is not obstructed while shifting to the extra low speed position EL, and hence the synchromesh device 16 (FIG. 1) can be engaged with the driven gear 15b for the extra low speed driving.

In the extra low speed position, since the projecting end 42a engages the recess 41a, the shifter rail 32 cannot be shifted to the two-wheel driving position. Thus, the extra low speed driving of the automobile with two wheels is reliably prevented.

From the foregoing it will be understood that the present invention provides an apparatus for preventing the gearshift lever from shifting to the extra low speed position at two-wheel driving of a vehicle and for preventing changing to the latter at the extra low speed position.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. A gear shifting apparatus of a transmission for a four-wheel drive vehicle having two sets of driving wheels, comprising:

a final reduction device for transmitting the output of said transmission to one of said two sets of driving wheels;

a clutch for transmitting the output of said transmission to the other set of driving wheels;

an extra low speed gear provided in said transmission and having a reduction gear ratio higher than that of a first speed gear of said transmission;

first means for engaging said extra low speed gear;

second means for engaging said clutch for four-wheel driving;

a lock device operatively connected to said first and second means for selectively locking said means so that engagement of said extra low speed gear by said first means occurs only during engagement of said clutch by said second means, said lock device comprises an engaging arm secured to said first means and an engaging projection formed at said second means, said engaging projection has a locking portion which obstructs movement of said engaging arm so as to prevent said first means from engaging said extra low speed gear, said first means and said second means are substantially oriented perpendicularly to each other.

2. A gear shifting apparatus of a transmission for a four-wheel drive vehicle having two sets of driving wheels, comprising:

a final reduction device for transmitting the output of said transmission to one of said two sets of driving wheels;

a clutch for transmitting the output of said transmission to the other set of driving wheels;

an extra low speed gear device provided in said transmission and having a reduction gear ratio higher than that of a first speed gear of said transmission;

first means for engaging said extra low speed gear device;

second means for engaging said clutch for four-wheel driving;

a lock device operatively connected to said first and second means for locking said first means when said second means disengages said clutch for preventing the engagement of said extra low speed gear device by the operation of said first means; and wherein said first means comprises a shifter rod operated by a gearshift lever of said vehicle for selectively engaging change speed gears in said transmission;

said second means comprises a shifter rail for engaging said clutch;

said lock device comprises an engaging arm secured to said shifter rod and an engaging projection formed at an end of shifter rail, said engaging projection has a locking portion which obstructs the movement of said arm to an extra low speed position; and said shifter rod and said shifter rail are substantially oriented perpendicularly to each other.

* * * * *